United States Patent
Heuer (10) Patent No.: US 11,186,195 B2
(45) Date of Patent: Nov. 30, 2021

(54) CONTROL DEVICE AND METHOD FOR CONTROLLING A CHARGING POINT

(71) Applicant: EcoG GmbH, Oberhaching (DE)

(72) Inventor: Jörg Heuer, Oberhaching (DE)

(73) Assignee: EcoG GmbH, Oberhaching (DE)

(*) Notice: Subject to any disclaimer, the term of this patent is extended or adjusted under 35 U.S.C. 154(b) by 14 days.

(21) Appl. No.: 16/604,457

(22) PCT Filed: Jan. 9, 2018

(86) PCT No.: PCT/EP2018/050396
§ 371 (c)(1),
(2) Date: Oct. 10, 2019

(87) PCT Pub. No.: WO2018/188819
PCT Pub. Date: Oct. 18, 2018

(65) Prior Publication Data
US 2020/0148069 A1    May 14, 2020

(30) Foreign Application Priority Data
Apr. 10, 2017  (DE) .................. 10 2017 206 106.5

(51) Int. Cl.
*B60L 53/65* (2019.01)
*B60L 53/30* (2019.01)
*B60L 53/66* (2019.01)
*B60L 53/31* (2019.01)

(52) U.S. Cl.
CPC ............ *B60L 53/65* (2019.02); *B60L 53/305* (2019.02); *B60L 53/31* (2019.02); *B60L 53/665* (2019.02)

(58) Field of Classification Search
CPC ...................................................... B60L 53/65
USPC ........................................................ 320/109
See application file for complete search history.

(56) References Cited

U.S. PATENT DOCUMENTS

| | | | | |
|---|---|---|---|---|
| 9,348,381 B2* | 5/2016 | Khoo | ................... | H01M 10/44 |
| 2011/0148574 A1* | 6/2011 | Simon | ................... | B60R 25/24 |
| | | | | 340/5.61 |
| 2011/0215921 A1* | 9/2011 | Ben Ayed | ................. | H04B 7/00 |
| | | | | 340/539.11 |
| 2011/0313922 A1* | 12/2011 | Ben Ayed | .............. | G06Q 20/32 |
| | | | | 705/42 |

(Continued)

FOREIGN PATENT DOCUMENTS

| | | |
|---|---|---|
| DE | 102012221288 A1 | 5/2014 |
| EP | 2769871 A2 | 8/2014 |
| WO | 2013123988 A2 | 8/2013 |

OTHER PUBLICATIONS

International Search Report in PCT/EP2018/050396, dated Apr. 3, 2018.

*Primary Examiner* — Suchin Parihar
(74) *Attorney, Agent, or Firm* — Seyfarth Shaw LLP (57) ABSTRACT

A control device which, in addition to pairing a charging station with a vehicle to be charged, also pairs a control connection to a mobile terminal of a charging station user. A control connection via a near-field communications interface is formed with the mobile terminal (MD) after an authorisation from a vehicle-side and terminal-side authorisation pair is received. After the control connection has been formed, the charging station is assigned based on an interaction between the control connection, formed using the near-field communications interface, and the vehicle-side authorization.

19 Claims, 2 Drawing Sheets

(56) References Cited

U.S. PATENT DOCUMENTS

| | | | |
|---|---|---|---|
| 2013/0110296 A1* | 5/2013 | Khoo | B60L 53/31 |
| | | | 700/286 |
| 2014/0035526 A1 | 2/2014 | Tripathi et al. | |
| 2014/0142783 A1* | 5/2014 | Grimm | H04W 4/48 |
| | | | 701/2 |
| 2014/0266047 A1* | 9/2014 | Robers | B60L 53/665 |
| | | | 320/109 |
| 2015/0121108 A1* | 4/2015 | Agrawal | H04L 63/107 |
| | | | 713/323 |
| 2015/0166009 A1* | 6/2015 | Outwater | B60R 25/04 |
| | | | 701/2 |
| 2016/0364776 A1 | 12/2016 | Khoo et al. | |
| 2017/0024552 A1 | 1/2017 | Rodine | |
| 2018/0336551 A1* | 11/2018 | Mouftah | G06Q 20/18 |
| 2019/0044393 A1* | 2/2019 | Louis | H04B 5/0037 |
| 2019/0291589 A1* | 9/2019 | Erb | G06Q 20/18 |
| 2019/0354956 A1* | 11/2019 | Lee | G07C 9/00309 |
| 2019/0372385 A1* | 12/2019 | Cheikh | H02J 50/20 |
| 2020/0130643 A1* | 4/2020 | Bode | B60L 53/305 |
| 2020/0148070 A1* | 5/2020 | Takebayashi | B60L 53/66 |
| 2020/0164759 A1* | 5/2020 | Heuer | H04B 5/0081 |
| 2020/0381955 A1* | 12/2020 | Soryal | H04B 5/0037 |

\* cited by examiner

CONTROL DEVICE AND METHOD FOR CONTROLLING A CHARGING POINT

The invention relates to a control device and a method for controlling a charging station.

Electric vehicles or at least partially electrically powered vehicles have at least one accumulator, which is to be charged regularly during operation of the electric vehicle. For charging, the electric vehicle is parked at a charging station in order to charge its accumulators via an electric cable or by means of induction coils. Charging stations can be provided at a variety of possible locations, such as parking lots at motorway service areas, on the roadside, or in parking garages. For billing the withdrawn electric energy or any other charging service, the operator of a charging station must at least have knowledge of an identification date which is unambiguously assignable to an identity of the charging station user and which enables identification by third parties for billing or authorization, if necessary.

In the state of the art, methods are known which allow to carry out such identification and authorization of a charging station user at a charging station.

For example, the use of cards or credit cards for the wireless identification of a charging station user is well-known. The cardholder's authorization is verified in the charging station—possibly with the participation of an authorization server that is remote from the charging station—by means of the transferred identification data of the card, before the charging station approves charging.

In view of an everyday use of mobile terminal devices for payment transactions, the use of cards for identification and payment transactions is becoming increasingly obsolete. Mobile terminal devices, especially smart phones in connection with a corresponding application, are often used to identify a charging station user. After confirmation of the identity—which is optionally accompanied by additional authentication features such as PIN entry, etc.—an authorization is carried out, i.e. a determination as to whether the identified charging station user is authorized for use, followed by a choice and an approval of charging of the charging station desired by the charging station user.

Typically, such methods for identification and for choosing and allocating a charging station envisage that by means of the mobile terminal device a communication link to an authorization server is established, with which registered charging station users are administered and which controls the allocation of charging stations to respective charging station users. Via the communication link, the authorization server is informed about the identity of the charging station user and a chosen charging station. After authenticating and verifying an authorization of the charging station user, the authorization server transmits an approval of charging to the chosen charging station, whereupon the charging station user can initiate the start of the charging operation.

The state of the art has several serious disadvantages. In particular charging stations installed along long-distance routes are often located in an area that is only insufficiently supplied by a mobile phone network, so that establishing a communication link between the mobile terminal device and the authorization server—or alternatively: the charging station—is temporarily disturbed or impossible. Since in this case no identification of the charging station user can be carried out, an approval of charging cannot be granted.

Another problem during use of mobile terminal devices relates to the determination and transmission of the identity of the chosen charging station. For this purpose, in known methods, it is envisaged to determine the geographical coordinates of the mobile terminal device and to display to the charging station user on a display unit of the mobile terminal device the charging stations available at his current location. The user can then confirm the identity of the charging station chosen by him by selecting one of the displayed charging stations. The current geographic coordinates of a mobile terminal device are usually determined in cooperation with a satellite positioning system, such as the Global Positioning System or GPS operated by the United States Department of Defense. However, localization via satellite positioning systems may involve large inaccuracies in positioning determination, in particular immediately after switching on the mobile terminal device. With a correspondingly high density of adjacent charging stations, this inaccurate localization leads to an indeterminacy of the chosen charging station.

It is the object of the present invention to provide means for controlling a charging station with the involvement of a mobile terminal device which avoid the problems known from the state of the art.

The object is achieved by a control device having the features of claim 1.

According to the invention, a control device is provided which is part of or allocated to a charging station. A charging station is a general device at which a vehicle is charged with electric energy, and includes also charging stations, wall boxes, and so on. According to the invention, the control device, in addition to an allocation of the charging station to a vehicle to be charged, also conduces to an allocation of a control link to a mobile terminal device of a charging station user, i.e. usually the vehicle driver or holder, who wants to carry out a charging operation on his vehicle. On the mobile terminal device, a suitable application is executed, which carries out or supports the controlling method steps.

The control device according to the invention has an interface to the vehicle which is adapted to receive a vehicle-side proof of authorization. This interface to the vehicle is designed galvanically or wirelessly, for example. A galvanic interface is established, for example, via a charging cable, wherein data transmission is effected via Powerline Communication, or PLC, or via a data line which extends parallel to the charging cable or is integrated in the charging cable and extends parallel to a charging line. Alternatively, especially when carrying out the charging operation without charging cables by means of inductive charging coils, the interface is designed wirelessly. The interface to the vehicle is adapted to receive a vehicle-side proof of authorization, which is held in a control device of the vehicle.

The vehicle-side proof of authorization, among experts also known as credential, conduces to a possibly temporary proof of the identity of the vehicle or of the charging station user and may contain one or more authentication marks, usually represented by digital cryptographic signatures in the current state of the art. The proof of authorization transmitted by the vehicle or the signatures contained therein can be verified by an instance outside the vehicle, in particular by the control device or by an authorization server which is connected to the charging station via a data network or via a control line. For this purpose, the verifying instance can, among other things, completely or partially verify the cryptographic signatures by means of corresponding key material. This key material can be obtained from the vehicle, possibly in the form of an object which in turn was authenticated by a third party which is trustworthy for vehicle and charge control.

The proof takes place, for example, in the form of a user identifier in conjunction with at least one authentication feature, which is implemented, for example, using an asymmetric key pair.

A portion of the vehicle-side proof of authorization comprises a machine-readable and human-readable characterization of the vehicle, for example, wherein this portion does not necessarily include the authentication features described above.

In addition, the control device according to the invention comprises a further interface to a mobile terminal device of the charging station user. According to the invention, a wireless near-field communication interface is provided for connecting a corresponding near-field communication interface of the mobile terminal device. The near-field communication interface is configured for the exchange of at least a portion of a terminal-side proof of authorization and/or at least a portion of the vehicle-side proof of authorization with a mobile terminal device.

The above explanations regarding digital cryptographic signatures apply analogously to the terminal-side proof of authorization. The vehicle-side proof of authorization and the terminal-side proof of authorization form a pair of proofs of authorization, which were stored in advance in the vehicle and in the mobile terminal device, respectively.

A near field communication interface or near field communication in the sense of this description comprises all wireless communication modes which are not based on a transmission method with a cellular mobile radio network. In particular, the term near-field communication interface or near-field communication in the sense of this description is not limited to the similarly denoted transmission method "Near Field Communication" or NFC for the contactless exchange of data via electromagnetic induction.

The control device according to the invention comprises an allocation unit for establishing a control link via the near-field communication interface with the mobile terminal device upon receipt of at least one proof of authorization. The control link conduces to a control of the charging station with an application executed on the mobile terminal device. An in this respect provisional control link to the charging station conduces to, for example, the purpose of enabling the request of a start of the charging operation in advance, even though the actual charging operation only takes place after both proofs of authorization have been affirmatively verified. Controlling the charging station is understood here to mean, for example, an instruction to start or stop the charging operation.

Furthermore, the problem underlying the invention is solved by a method having the features of claim 8, and by a method having the features of claim 11. Both methods are based on the establishment of a control link according to the invention, but the method steps according to the invention vary within the scope of a solution according to the invention found in a uniform manner, depending on which proof of authorization—on the vehicle side or on the terminal side—is first received at the control device or at the mobile terminal device.

The following steps are carried out in accordance with a first embodiment of a method according to the invention:
a) receiving at least a portion of a vehicle-side proof of authorization by a control device allocated to the charging station;
b) transmitting, by the control device, at least the portion of the vehicle-side proof of authorization via a near-field communication link;
c) receiving at least the portion of the vehicle-side proof of authorization by a mobile terminal device; and
d) establishing a control link between the mobile terminal device and the control device via the near-field communication interface after receipt of at least the portion of the vehicle-side proof of authorization.

The above-mentioned first embodiment of the method according to the invention envisages that first the vehicle-side proof of authorization is delivered to the control device allocated to the charging station. Such method is carried out in accordance with the invention if the charging station user first connects the charging cable between the charging station and the vehicle and only then establishes a near-field communication between his mobile terminal device and the charging station.

The following steps are carried out in accordance with a second embodiment of a method according to the invention:
a) receiving, by a control device allocated to the charging station, at least a portion of a terminal-side proof of authorization transmitted from a mobile terminal device via a near-field communication link; and
b) establishing a control link between the control device and the mobile terminal device via the near-field communication interface after receipt of the terminal-side proof of authorization.

The above-mentioned second embodiment of the method according to the invention envisages that the terminal-side proof of authorization is first delivered to the control device allocated to the charging station. According to the invention, such method is carried out if the charging station user first establishes a near-field communication between his mobile terminal device and the charging station and only then connects the charging cable between the charging station and the vehicle.

The invention is characterized by an asynchronous—i.e. not fixed in terms of their sequence and timing—transmission of proofs of authorization which, in cooperation with a near-field communication interface, leads to a provisional establishment of a provisional control link between the charging station and the vehicle, as well as a mobile terminal device for controlling the charging operation. Only after both proofs of authorization have been provided—see the embodiments of the control device according to the invention and of the method according to the invention—a final allocation of the charging station to the vehicle is carried out with control of the charging station via the mobile terminal device.

Another advantage of the invention is that the charging station user does not need to choose a charging station. After the control link has been established, the charging station is allocated by cooperation of the control link established with the near-field communication interface and the vehicle-side proof of authorization.

The use of a near-field communication interface is advantageous for ensuring independency from mobile network coverage.

Further embodiments of the invention are the subject of the dependent claims.

A first embodiment is directed to the allocation unit, by means of which, after establishing the control link via the near-field communication interface to the mobile terminal, an allocation of the charging station to the vehicle is initiated, in particular in order to start and, if necessary, to stop an approval of charging for charging the vehicle.

In accordance with a preferred embodiment of the invention, the allocation unit is adapted to allocate the charging station to the vehicle with control of the charging station by the mobile terminal device after receipt and positive verification of both proofs of authorization by the control device.

Alternatively, it may be envisaged that the allocation unit initiates an allocation of the charging station to the vehicle on the basis of a verification outside of the control device, namely after receipt of a positive verification message on the basis of a positive verification of both proofs of authorization by the mobile terminal device. In this embodiment of the invention, the terminal-side proof of authorization and the vehicle-side proof of authorization are verified in the mobile terminal device and a result of the verification is transmitted to the control device which, in case of a positive verification of both authorization verifications, allocates the charging station to the vehicle.

In the following, embodiments of the method according to the invention and of the control device according to the invention are described with reference to the enclosed drawing figures.

Figure 1:
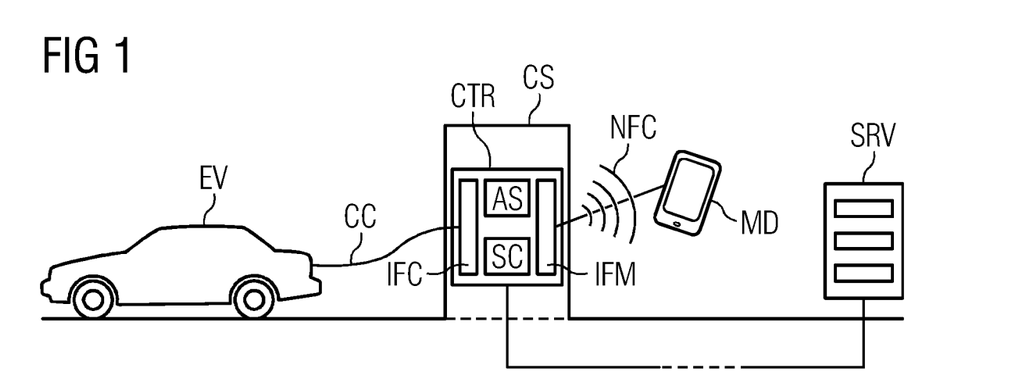
FIG. 1 shows a block diagram illustrating a charging infrastructure in cooperation with functional units according to the invention.

FIG. 1 shows a vehicle EV parked at a charging station CS. In the embodiment shown, energy is transmitted between charging station CS and vehicle EV via a charging cable CC. Alternatively, the vehicle EV can be charged inductively by means of several induction coils fed by the charging station. For the sake of clarity, further customary functional components within charging station CS which relate to the provision and processing of the electrical charging current are not shown. A control device CTR according to the invention is allocated to or integrated within charging station CS.

Control device CTR comprises an interface IFC to the vehicle EV, which is adapted to receive a vehicle-side proof of authorization. In the present embodiment, this interface IFC is galvanically designed and connected to charging cable CC. Data transmission between vehicle EV and interface IFC is carried out, for example, by Powerline Communication (PLC) via charging cable CC or alternatively via a separate data line—not shown—extending parallel to charging cable CC. If charging station CS is adapted for inductive charging, charging cable CC is omitted in favor of—not shown—inductive charging coils, through which electric energy is transferred inductively to respective—not shown—charging coils of vehicle EV. Also in this case, interface IFC is preferably designed wirelessly.

Interface IFC to the vehicle is adapted to receive a—not shown—vehicle-side proof of authorization, which is held in a—not shown—on-board control device. Further functional units for introducing the charging current into charging cable CC are not shown for the sake of clarity.

Control device CTR according to the invention comprises a further interface IFM to a mobile terminal device MD of the charging station user. The wireless near-field communication interface IFM is provided via an air interface NFC for connection to a corresponding—not shown—near-field communication interface of mobile terminal device MD.

The wireless and bidirectional air interface NFC between control device CTR and mobile terminal device MD is designed using common near-field communication protocols, for example. These include, for example:

- WLAN (Wireless Local Area Network) or WiFi (Wireless Fidelity), for example according to a communication standard of the standard family IEEE 802.11;
- Bluetooth according to a communication standard IEEE 802.15.1, Bluetooth Low Energy or BLE according to an extension of the Bluetooth specifications, for example according to Bluetooth Low Energy Specification 4.2; and/or;
- transmission methods for the contactless exchange of data by electromagnetic induction using loosely coupled coils, which is also referred to as Near Field Communication.

Near-field communication interface IFM is adapted for exchanging at least a portion of a terminal-side proof of authorization and/or at least a portion of the vehicle-side proof of authorization with a mobile terminal device MD.

Control device CTR also comprises an allocation unit AS for establishing a control link via near-field communication interface IFM to mobile terminal device MD after the reception of at least one proof of authorization. The control link conduces to a control of the charging station with an application executed on the mobile terminal device. An in this respect provisional control link to charging station CS conduces to, for example, the purpose that a start of the charging operation can be requested in advance, even though the actual charging operation with an allocation of charging station CS to vehicle EV is carried out only after both proofs of authorization have been provided.

For this purpose, allocation unit AS is also adapted for the final allocation of charging station CS to vehicle EV with control of charging station CS by mobile terminal device MD after receipt and positive verification of both proofs of authorization. Controlling the charging station here means, for example, an instruction for starting or stopping the charging operation.

Control device CTR has an optional communication unit SC for maintaining data communication with an authorization server SRV. The authorization server SRV supports user administration, identification and authorization for the charging process by charging station CS in a well-known way. In addition, this or another server can undertake other tasks such as determining and billing the electric energy withdrawn from charging station CS.

Figure 2:
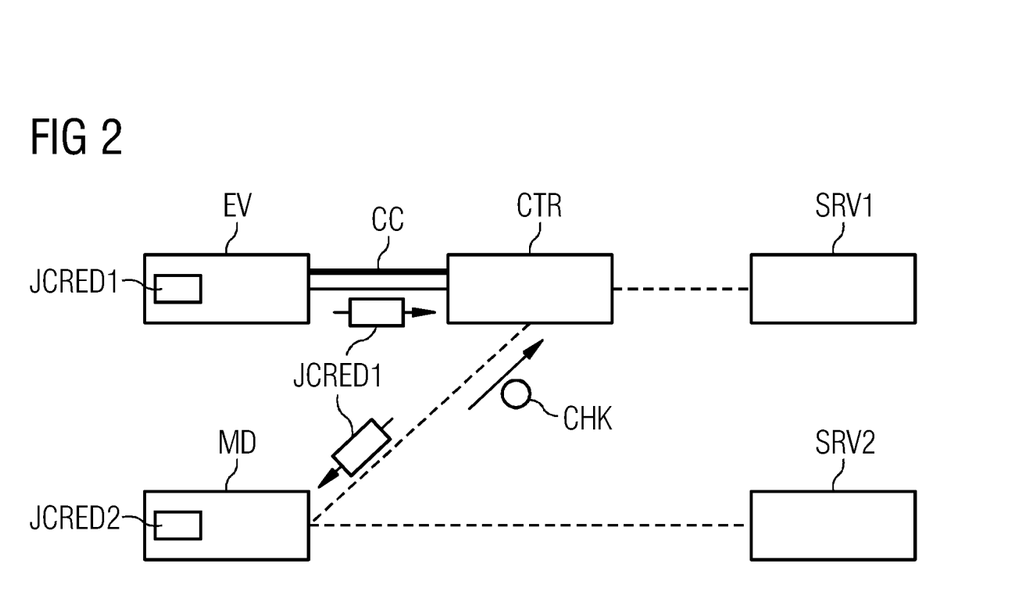
FIG. 2 shows a flow diagram illustrating an embodiment of the method according to the invention.

FIG. 2 shows a flow diagram illustrating an embodiment of the method according to the invention. In accordance with this embodiment of the method according to the invention, it is envisaged that a vehicle-side proof of authorization JCRED1 is first delivered to control device CTR allocated to charging station CS. This method is carried out according to the invention if the charging station user first connects charging cable CC between charging station CS and vehicle EV and only then establishes a near-field communication NFC between his mobile terminal device MD and the charging station.

With a connection of charging cable CC between charging station CS and vehicle EV, the vehicle-side proof of authorization JCRED1 held in the vehicle EV is transmitted to control device CTR via a data connection between vehicle EV and control device CTR—shown in the drawing parallel to the thicker drawn charging cable CC—and received by control device CTR via vehicle-side interface IFC of control device CTR—which is not shown in FIG. 2 for the sake of clarity.

Control device CTR processes the received vehicle-side proof of authorization JCRED1 such that an allocation can be made between that charging station CS—to which control device CTR is allocated—and vehicle EV. For this purpose, a portion of the vehicle-side proof of authorization JCRED1 is evaluated, which comprises, for example, a machine-readable and human-readable characterization of vehicle EV.

Depending on whether charging station CS operates largely independently, or whether a connection and administration of several charging stations by one or more central instances is envisaged, an identification and a verification of authorization can be envisaged using the proof of authorization JCRED1 delivered from the vehicle by an authorization server SRV1, which is connected to control device CTR via a data network or via a—dashed drawn—control line.

Subsequently, control device CTR provides at least a portion of the vehicle-side proof of authorization JCRED1 via the near field communication link NFC.

An operational mobile terminal device MD of a charging station user can receive this portion of the vehicle-side proof of authorization JCRED1 via near field communication link NFC. After reception of the vehicle-side proof of authorization JCRED1, or a portion of the vehicle-side proof of authorization JCRED1, by an application executed on mobile terminal device MD of the charging station user, a terminal-side verification of at least the portion of the vehicle-side proof of authorization JCRED1 is carried out by means of a terminal-side proof of authorization JCRED2. In the simplest case, this pair-wise verification of the proofs of authorization JCRED1, JCRED2 includes a verification of an identity, a checksum or a common certificate or key pair. In this verification, authorization server SRV2 is optionally involved.

The vehicle-side proof of authorization JCRED1 and the terminal-side proof of authorization JCRED2 form a pair of proofs of authorization, which are stored in advance in vehicle EV and/or in the mobile terminal device as well as alternatively or additionally in authorization server SRV2.

In case of a positive result of the terminal-side verification of the vehicle-side proof of authorization JCRED1 by means of the terminal-side proof of authorization JCRED2, a positive verification message CHK is transmitted from mobile terminal device MD to control device CTR.

After receiving the positive verification message CHK by the control device CTR, a control link to the mobile terminal device MD is established, which enables a control of charging station CS by mobile terminal device MD.

With this control link, an approval of charging, i.e. a start of the electric energy transmission between charging station CS and vehicle EV, can be carried out by entering a corresponding command on the application executed on mobile terminal device MD. In a similar way, the charging operation is stopped or terminated by entering a corresponding command on mobile terminal device MD.

In addition to or instead of an administration of one of the authorization servers SRV1 communicatively connected to control device CTR, an authorization server SRV2 communicatively connected to mobile terminal device MD via a—dashed drawn—wireless connection may also be provided, to which the proofs of authorization JCRED1, JCRED2, which are at least partially present at the mobile terminal device, are transmitted for identification and authorization of the charging station user.

In addition, this second authorization server SRV2 or both authorization servers SRV1, SRV2 can undertake further tasks such as determining and billing the electric energy withdrawn from charging station CS.

In an alternative embodiment—that is not shown in the drawings—no terminal-side verification of both proofs of authorization JCRED1 and JCRD2 takes place after receipt of the portion of the vehicle-side proof of authorization JCRED1 on mobile terminal device MD. Instead, after receipt of the vehicle-side proof of authorization JCRED1 at mobile terminal device MD, the terminal-side proof of authorization JCRED2 is transmitted to control device CTR, where the verification of both proofs of authorization JCRED1 and JCRED2 is carried out. In this embodiment, no verification message CHK is transmitted from mobile terminal device MD to control device CTR, but the terminal-side proof of authorization JCRED2, without performing a verification in the mobile terminal device. The verification is then carried out in control device CTR.

Figure 3:
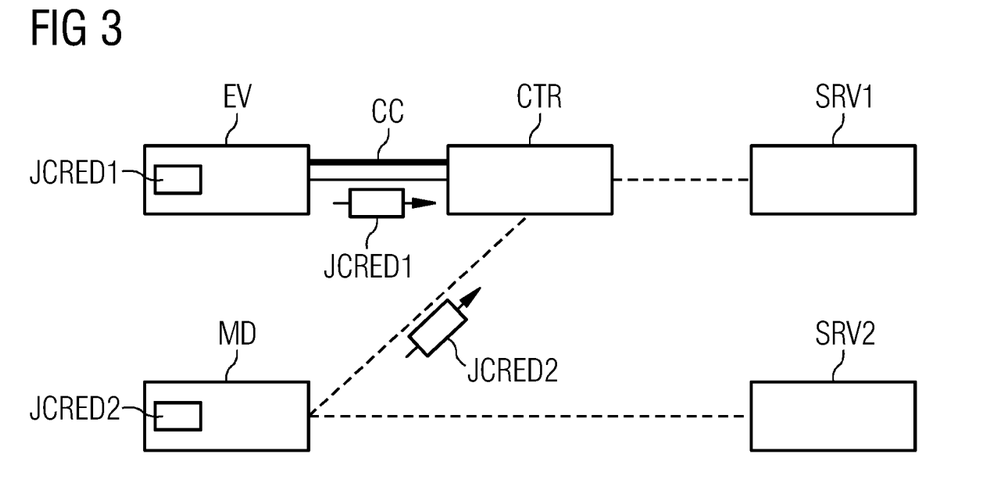
FIG. 3 shows a flow diagram illustrating another embodiment of the method according to the invention.

FIG. 3 is a flow diagram for the illustration of a second embodiment of the method according to the invention. According to this second embodiment of the method according to the invention, it is envisaged that a terminal-side proof of authorization JCRED2 is first transferred to control device CTR allocated to charging station CS. This method is carried out according to the invention if the charging station user first establishes a near-field communication NFC between his mobile terminal device and the charging station and only then connects the charging cable between the charging station and the vehicle. In a direct vicinity of a plurality of charging stations CS, a control link is established to several unoccupied charging stations CS, i.e. charging stations ready for operation and reception, and several potential control links to mobile terminal device MD are provided, when the terminal-side proof of authorization JCRED2 is delivered. Only by connecting charging cable CC, a one-to-one allocation between charging station CS and vehicle EV is established. All other charging stations CS not allocated within a definable period of time terminate the control link as a result of a timeout, alternatively or additionally also by an active instruction from mobile terminal device MD.

For this purpose, a near-field communication interface NFC is formed at control device CTR, which enables the charging station user to initiate a transmission of at least a portion of his proof of authorization JCRED2 provided on the terminal side. This terminal-side proof of authorization JCRED2 is received and temporarily stored by control device CTR.

With a subsequent connection of charging cable CC between charging station CS and vehicle EV, the vehicle-side proof of authorization JCRED1 provided in vehicle EV is transmitted to control device CTR via a data connection—shown in the drawing parallel to the thicker drawn charging cable CC—between vehicle EV and control device CTR.

Control device CTR processes the received vehicle-side proof of authorization JCRED1 such that the vehicle-side proof of authorization JCRED1 is verified by means of the temporarily stored terminal-side proof of authorization JCRED2—or at least portions thereof. In this verification, the authorization server SRV1 is optionally involved.

In case of a positive result of this verification, charging station CS is allocated to vehicle EV and to the mobile terminal device of the charging station user, which enables a control of charging station CS by mobile terminal device MD. With this control, an approval of charging, i.e. a start of the electric energy transmission between charging station CS and vehicle EV, can take place by entering a corresponding command on the application executed on mobile terminal device MD. In a similar way, the charging operation is stopped by entering a corresponding command on mobile terminal device MD.

A particular advantage of the method according to the invention is particularly shown in this embodiment in that the charging station user does not need to choose a charging station CS—for example by entering a charging station number into the mobile terminal device or by choosing it from a list—in order to perform an unambiguous allocation of a charging station CS from a plurality of charging stations available in the direct vicinity. In the direct vicinity of a plurality of charging stations CS, the mobile terminal device MD establishes a control link to several unoccupied charging stations, i.e. charging stations ready for operation and reception, and several potential control links are provided. Only by connecting charging cable CC, a one-to-one allocation between charging station CS and vehicle EV is established. All other charging stations CS not allocated within a definable period of time terminate the control link as a result of a timeout and/or by mobile terminal device MD.

In an alternative embodiment—that is not shown in the drawings—after receipt of the terminal-side proof of authorization JCRED2 at control device CTR, no verification of both proofs of authorization JCRED1 and JCRED2 is carried out in control device CTR itself. Instead, after receipt of the terminal-side proof of authorization JCRED2 at control device CTR, it is waited until the vehicle-side proof of authorization JCRED1 is present at control device CTR—i.e. usually after vehicle EV has been connected to charging cable CC, in which case a communicative link is also established. The vehicle-side proof of authorization JCRED1 is then transmitted without verification by the control device to mobile terminal device MD, where both proofs of authorization JCRED1 and JCRED2 are verified. In case of a positive result of the terminal-side verification of the vehicle-side proof of authorization JCRED1 by means of the terminal-side proof of authorization JCRED2, a positive verification message CHK is then transmitted from mobile terminal device MD to control device CTR.

In accordance with an advantageous further development of the invention, it is envisaged to provide a Media Access Control address or MAC address of the vehicle as part of the proof of authorization JCRED1 and/or also of the terminal-side proof of authorization JCRED2. This measure is particularly advantageous since the MAC address of the vehicle is currently already used for a communication between the vehicle and a charging station.

To protect against manipulation by malicious charging station users or also against malicious charging station operators, a cryptographic protection of the data communication and certificate-based verification of the proofs of authorization JCRED1; JCRED2 can be carried out in various further developments of the invention.

According to an advantageous further development of the invention, it is envisaged to cryptographically protect the near-field communication link NFC between control device CTR and mobile terminal device MD. The protection is preferably carried out with the involvement of a digital certificate for the cryptographically protected confirmation of properties, in particular of a public key certificate for the confirmation of public keys.

In one embodiment, the involvement of a provisionally verified digital certificate is envisaged. In accordance with this embodiment, a transmission of a provisionally verified digital certificate of mobile terminal device MD or of a verification information extracted therefrom by mobile terminal device MD via near-field communication link NFC to control device CTR is envisaged, based on which control device CTR, optionally in cooperation with authorization server SRV1, performs an authorization verification of mobile terminal device MD. Subsequently, a result of this verification is transferred from authorization server SRV1 to control device CTR, which, depending on the received authorization verification result, approves a control of charging station CS by mobile terminal device MD, or not.

Depending on the implementation, the provisionally verified digital certificate is either part of the terminal-side proof of authorization JCRED2, or the terminal-side proof of authorization JCRED2 is part of the provisionally verified digital certificate. This also applies to the vehicle-side proof of authorization JCRED1.

In one embodiment of the method according to the invention, the near-field communication link NFC is cryptographically protected by means of a protocol for encrypting data transmissions, for example by means of Transport Layer Security or TLS, Secure Sockets Layer or SSL, or Internet Protocol Security or IPsec.

With an advantageous further development of the invention, the communication links between control device CTR and authorization server SRV1, between control device CTR and vehicle EV, as well as between the mobile terminal device and authorization server SRV2 are also each or in total cryptographically protected.

In one embodiment, the result of the verification comprises charging rules for controlling the charging operation by charging station CS. As an alternative to the charging rules themselves, control data or control signals for activating such charging rules by an on-board control device of vehicle EV—which is not shown—may also be transmitted from control device CTR or from authorization server SRV1 via control device CTR to the on-board control device. These charging rules may also reside in a data memory of the on-board control device of vehicle EV, to which control device CTR of charging station CS has access via vehicle-side interface IFC.

The control device CTR according to the invention not only establishes an allocation of a charging station CS to a vehicle to be charged, but also an allocation of a control link to a mobile terminal device MD of a charging station user. A control link is established via a near-field communication interface NFC to mobile terminal device MD after receipt of at least one proof of authorization of a pair of proofs of authorization JCRED1, JCRED2 on the vehicle side and on the terminal side. After the control link has been established, the allocation of charging station CS is carried out by a cooperation of the control link established with near-field communication interface NFC and the vehicle-side proof of authorization JCRED1. The use of a near-field communication interface NFC is advantageous for ensuring independency from mobile network coverage.

The invention claimed is:

1. A control device allocated to a charging station for charging a vehicle, the control device comprising:
   an interface to the vehicle for receiving a vehicle-side proof of authorization from the vehicle;
   a near-field communication interface for exchanging a terminal-side proof of authorization with a mobile terminal device; and
   an allocation unit for:
      establishing a control link with the mobile terminal device via the near-field communication interface after receiving the terminal-side proof of authorization or the vehicle-side proof of authorization; and
      allocating the charging station to the vehicle after receiving the terminal-side proof of authorization or the vehicle-side proof of authorization of and also after positively verifying the terminal-side proof of authorization or the vehicle-side proof of authorization.

2. The control device of claim 1, wherein the near-field communication interface for operating a local radio network operates in accordance a communication standard of a standard family IEEE 802.11.

3. The control device, of claim 1, wherein the near-field communication interface for operating a local radio network operates in accordance with a communication standard IEEE 802.15.1.

4. The control device of claim 1, wherein the near-field communication interface for operating a local radio network operates in accordance with Bluetooth specification 4.2 and/or further developments according to Bluetooth Low Energy specifications.

5. The control device, of claim 1, wherein the near-field communication interface is configured for contactless data exchange by electromagnetic induction via coils.

6. A method for controlling a charging station for charging a vehicle, comprising:
receiving, at a control device allocated to the charging station, at least a portion of a vehicle-side proof of authorization via a connection with the vehicle;
transmitting, by the control device, at least the portion of the vehicle-side proof of authorization via a near-field communication link;
establishing a control link between the mobile terminal device and the control device via the near-field communication interface after receipt of at least the portion of the vehicle-side proof of authorization at the mobile terminal device;
receiving, at the control device after establishing the control link, a terminal-side proof of authorization from the mobile terminal device via the near-field communication link;
verifying, at the control device, at least the portion of the vehicle-side proof of authorization based on at least the portion of the terminal-side proof of authorization; and
allocating the charging station to the vehicle in response to a positive verification of at least the portion of the vehicle-side proof of authorization.

7. The method of claim 6, further comprising verifying the at least one vehicle-side proof of authorization, or of a portion thereof, via at least one authorization server.

8. The method of claim 6, further comprising establishing a cryptographically protected data link via the near-field communication link.

9. The method of claim 6, wherein one or both of the terminal-side proof of authorization or the vehicle-side proof of authorization comprises a digital certificate.

10. The method of claim 6, wherein a digital certification comprises one or both of the terminal-side proof of authorization or the vehicle-side proof of authorization.

11. The method of claim 6, wherein one or both of the vehicle-side proof of authorization or of the terminal-side proof of authorization comprise a media access control (MAC) address of the vehicle.

12. A method for controlling a charging station for charging a vehicle, comprising:
receiving, at a control device allocated to the charging station, at least a portion of a terminal-side proof of authorization transmitted from a mobile terminal device via a near-field communication link;
establishing a control link between the control device and the mobile terminal device via the near-field communication interface after receipt of at least a portion of the terminal-side proof of authorization;
receiving, at the control device after establishing the control link, at least a portion of a vehicle-side proof of authorization via a connection with the vehicle;
verifying, by the control device, at least the portion of the vehicle-side proof of authorization based on at least the portion of the terminal-side proof of authorization; and
allocating the charging station to the vehicle in response to positive verification of at least the portion of the vehicle-side proof of authorization.

13. A non-transitory computer-readable medium having program code recorded thereon for controlling a charging station for charging a vehicle, the program code executed by a processor and comprising:
program code to receive, at a control device allocated to the charging station, at least a portion of a vehicle-side proof of authorization via a connection with the vehicle;
program code to transmit, by the control device, at least the portion of the vehicle-side proof of authorization to a mobile terminal device via a near-field communication link;
program code to establish a control link between the mobile terminal device and the control device via the near-field communication interface after receipt of at least the portion of the vehicle-side proof of authorization at the mobile terminal device;
program code to receive, at the control device after establishing the control link, a terminal-side proof of authorization from the mobile terminal device via the near-field communication link;
program code to verify, at the control device, at least the portion of the vehicle-side proof of authorization based on at least the portion of the terminal-side proof of authorization; and
program code to allocate the charging station to the vehicle in response to a positive verification of at least the portion of the vehicle-side proof of authorization.

14. A control device allocated to a charging station for charging a vehicle, the control device comprising:
an interface to the vehicle for receiving a vehicle-side proof of authorization;
a near-field communication interface for exchanging at least one proof of authorization comprising the vehicle-side proof of authorization with a mobile terminal device;
an allocation unit for:
establishing a control link with the mobile terminal device via the near-field communication interface after receiving the vehicle-side proof of authorization or after receiving a terminal-side proof of authorization via the near-field communication interface; and
allocating the charging station to the vehicle after receiving a positive verification message based on a positive verification of the vehicle-side proof of authorization and the terminal-side proof of authorization by the mobile terminal device.

15. The control device of claim 14, wherein the near-field communication interface operates in accordance with one of a communication standard of a standard family IEEE 802.11, a communication standard IEEE 802.15.1, or a Bluetooth standard.

16. A method for controlling a charging station for charging a vehicle, comprising:

receiving, at a control device allocated to the charging station, at least a portion of a vehicle-side proof of authorization via a connection with the vehicle;

transmitting, by the control device, at least the portion of the vehicle-side proof of authorization to a mobile terminal device via a near-field communication link;

establishing a control link between the mobile terminal device and the control device via the near-field communication interface after receipt of at least the portion of the vehicle-side proof of authorization at the mobile terminal device;

receiving, at the control device from the mobile terminal device after establishing control link, a verification message indicating a positive verification of at least the portion of the vehicle-side proof of authorization via the near-field communication link; and allocating the charging station to the vehicle in response to the positive verification.

17. The method of claim 16, further comprising establishing a cryptographically protected data link via the near-field communication link.

18. A method for controlling a charging station for charging a vehicle, comprising:

receiving, at a control device allocated to the charging station, at least a portion of a terminal-side proof of authorization transmitted from a mobile terminal device via a near-field communication link;

transmitting at least a portion of a vehicle-side proof of authorization to the mobile terminal device;

establishing a control link between the control device and the mobile terminal device via the near-field communication interface after receipt of the terminal-side proof of authorization at the mobile terminal device;

transmitting, from the control device to the mobile terminal device after establishing the control link, at least a portion of a vehicle-side proof of authorization via the near-field communication link;

receiving, at the control device from the mobile terminal device, a verification message indicating a positive verification of at least the portion of the vehicle-side proof of authorization;

allocating the charging station to the vehicle in response to the positive verification.

19. The method of claim 18, further comprising establishing a cryptographically protected data link via the near-field communication link.

\* \* \* \* \*